INVENTOR.
Francis J. Markey
BY
J.C. Evans
ATTORNEY

United States Patent Office 3,623,372
Patented Nov. 30, 1971

3,623,372
TEST INSTRUMENT FOR AUTOMOTIVE COOLING SYSTEM
Francis J. Markey, Lewisburg, Ohio, assignor to General Motors Corporation, Detroit, Mich.
Filed Nov. 13, 1969, Ser. No. 876,253
Int. Cl. G01f 17/00
U.S. Cl. 73—49.7
2 Claims

ABSTRACT OF THE DISCLOSURE

Apparatus for measuring the volume of trapped air within an automobile cooling system having a conventional radiator. A hydraulic pump is fluidly connected to the radiator through a passage in a modified closure cap until a pressure of 15 p.s.i. gage is attained in the radiator as indicated by a gage connected to the pump outlet. The pressurized coolant in the radiator is subsequently depressurized and discharged into a graduated container which measures its volume. The measured volume of coolant dispelled equals the volume of trapped air within the cooling system at 15 p.s.i. gage pressure. The volume of trapped air at atmospheric pressure within the cooling system equals approximately twice the volume of coolant discharged.

---

Figure 1:
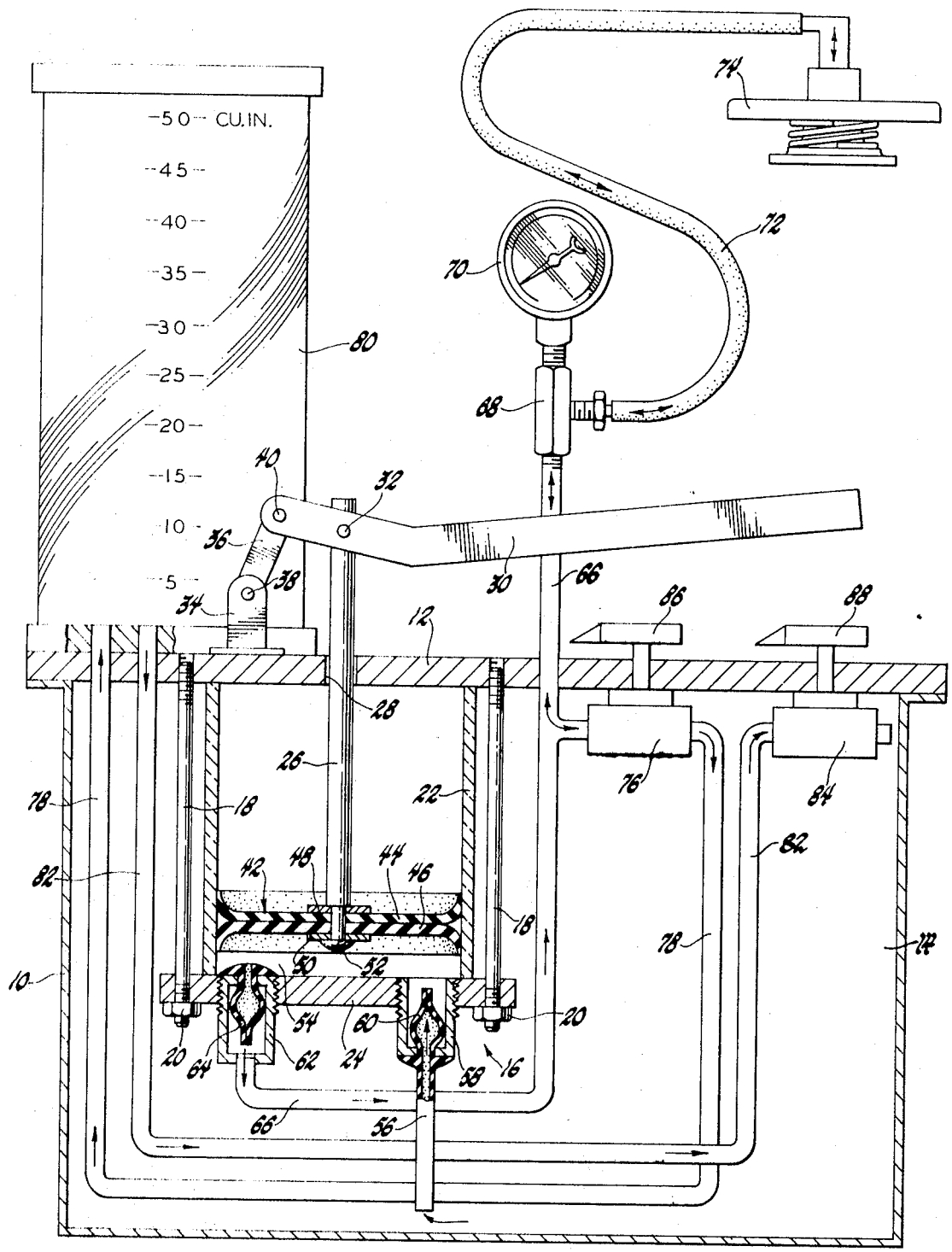

This invention relates to apparatus for measuring the volume of trapped air within an automobile cooling system which appears full of coolant.

After an automobile is assembled on the assembly line, its cooling system is filled with water or other coolant so the engine may be run. The cooling system consists of passages within the internal combustion engine block, a heat exchanger or radiator and flexible hoses therebetween. When leakage in the cooling system is discovered after the initial fill up, the automobile is removed from the main assembly line and placed in a repair line for special attention.

Improperly fitted hoses or insufficiently tightened hose clamps are common causes of leakage and entrance of air into the cooling system usually results. The air in the cooling system is often trapped within cavities in the engine block which prevents complete filling of the system after repairs have been made. Although the radiator appears filled, the system may contain trapped air.

When work is done on automobile radiator hoses or radiators in repair garages, trapped air again often prevents complete filling of the cooling system. This is undesirable because proper cooling of modern internal combustion engines requires a prescribed volume of coolant.

Apparatus to indicate the presence of trapped air within cooling systems of internal combustion engines is desirable after assembly of the automobile and subsequently after repairs are made on the cooling system. The present invention utiilzes a hydraulic pump to pressurize to 15 p.s.i. gage the cooling system of an internal combustion engine which appears to be full of coolant. A pressure gage at the pump outlet indicates the radiator's pressure. A graduated container fluidly connected to the radiator measures the volume of coolant discharged from the pressurized cooling system as it is depressurized. Because the coolant is incompressible and air is compressible, the volume of coolant discharged from the cooling system equals approximately one-half the volume of trapped air within the cooling system at atmospheric pressure. By repeated pressurization and depressurization of the cooling system, trapped air is removed from the cooling system.

Therefore an object of the inventor in the present application is to provide apparatus which measures the volume of trapped air within an apparently full cooling system of an internal combustion engine.

A further object of the inventor in the present invention is to provide apparatus which removes trapped air from the cooling system of an internal combustion engine by repeated pressurization and depressurization of its cooling system.

A still further object of the inventor in the present invention is to provide apparatus to pressurize an automobile cooling system which indicates leakage of coolant by pressurizing the cooling system of an internal combustion engine.

Further objects and advantages of the present invention will be apparent from the following description with reference to the accompanying drawing wherein a preferred embodiment of the present invention is clearly shown.

Figure 2:
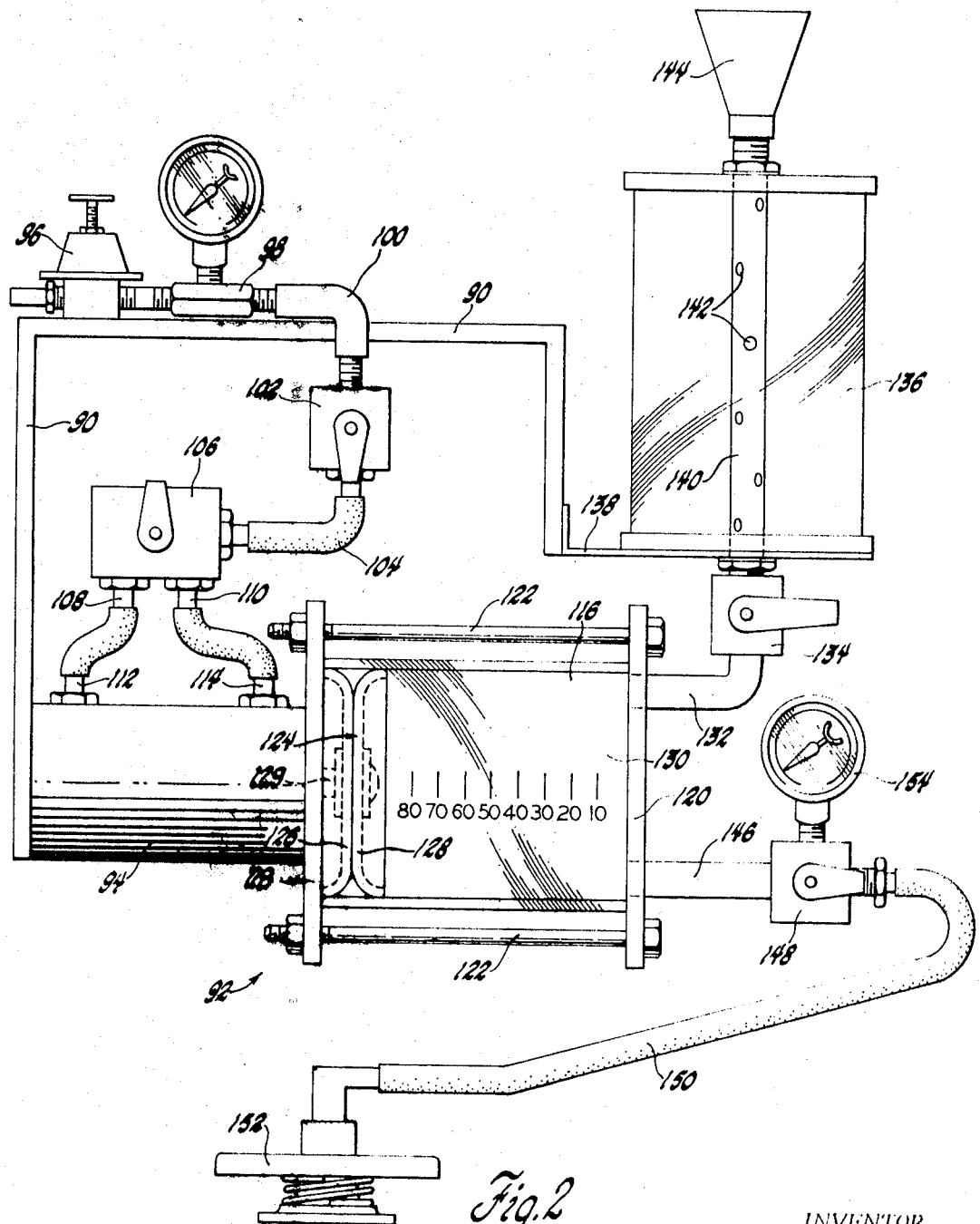

In the drawings:
FIG. 1 is a vertical sectioned view of one embodiment of the present invention; and
FIG. 2 is a vertical sectioned view of a second embodiment of the present invention.

In FIG. 1 of the drawings, one embodiment of the present invention is illustrated. The apparatus includes a housing 10 adapted to hold water or other coolant. The housing 10 is closed by a top 12 which is secured to the housing 10 by conventional fastening means (not shown). Housing 10 and top 12 form a coolant reservoir 14.

A hydraulic pump assembly 16 in reservoir 14 is attached to top 12 by a plurality of bolts 18 and nuts 20. The pump 16 has a cylinder 22 with its upper end abutting top 12 and its lower end covered by a head plate 24. A piston rod 26 which extends through a bore 28 in top 12 is attached at its upper end to a lever 30 by a pin 32. Lever 30 is pivotally connected to a fixed bracket 34 by a link 36. Pins 38 and 40 connect link 36 between bracket 34 and to lever 30 respectively. A piston 42 is attached to the lower end of piston rod 26 for reciprocation together within cylinder 22. Piston 42 is formed by resilient circular discs 44 and 46 which are held together between washers 48 and 50 by a fastener 52. The space formed within cylinder 22 between piston 42 and cylinder head 24 is a variable volume pump chamber 54.

Coolant is drawn from the reservoir 14 through a tube 56 and into a pump inlet 58. Inlet 58 is threadably attached to head plate 24 and supports an inlet valve 60. An outlet 62 is threadably attached to head plate 24 and supports an outlet valve 64 to regulate the flow of water from the chamber 54. A tube 66 extends from outlet 62 through top 12 to a T-connector 68. A pressure gauge 70 is connected to T-connector 68 to indicate the pressure of outlet coolant. A flexible hose 72 connects the T-connector 68 to a modified radiator closure or cap 74. The radiator cap 74 is adapted to fit the filler opening of an automobile radiator. A fluid passage (not shown) through radiator cap 74 passes coolant from pump 16 into the radiator.

A rotary on-off valve 76 has an inlet connected to tube 66 and an outlet connected by a tube 78 to a container 80. Container 80 is a transparent glass or plastic cylinder which is graduated to measure the volume of water therein. The container 80 is fluidly connected by a tube 82 to a rotary on-off valve 84 having an outlet to reservoir 14.

The volume of trapped air within a cooling system of an internal combustion engine is measured by first attaching the modified cap 74 to the filler opening of a coolant filled radiator. Next, valves 76 and 84 are set in their off positions by knobs 86 and 88 respectively. Lever 30 is pivoted to cause the piston rod 26 and piston 42 to reciprocate within cylinder 22. Reciprocation of piston 42 on the upward stroke draws coolant through inlet 58 and inlet valve 60 into chamber 54. Reciprocation of the piston 42 downward in cylinder 22 forces coolant in chamber 54 through outlet 62, tube 66, T-connector 68, hose 72 and the passage in the radiator cap 74 into the radiator. The lever 30 is manually pivoted until pressure gauge 70 indicates a predetermined pressure. A convenient pressure for the radiator is 15 p.s.i. which is approximately twice normal atmospheric pressure.

After the radiator is pressurized, valve 76 is opened to permit pressurized coolant from the radiator to flow through the passage in cap 74, hose 72, T-connector 68, tube 66, valve 76, tube 78 and into graduated container 80. The graduations on container 80 indicate the volume of pressurized coolant expelled from the radiator. Container 80 is emptied by closing valve 76 and opening valve 84 which allows coolant to flow from the container 80 through tube 82 and valve 84 into the reservoir 14.

If container 80 fills to 50 cubic inches, its maximum volume, before depressurization of the radiator container 80 is emptied by closing valve 76 and opening valve 84. Further depressurization of the radiator is accomplished by closing valve 84 and opening valve 76 to again discharge coolant from the radiator into container 80. The total volume of coolant expelled equals the sum of separate readings.

The cumulative volume of coolant discharged into container 80 equals the volume of trapped air within the cooling system at 15 p.s.i.g. which is approximately twice atmospheric pressure. This volume of air is inversely proportional to pressure. Therefore, the volume of coolant expelled from the radiator equals the volume of trapped air within the radiator at 15 p.s.i.g. which is approximately ½ the volume of trapped air at atmospheric pressure.

The volume of trapped air in the cooling system at atmospheric pressure (v) can be determined from the following general equation wherein C is the volume of coolant expelled, Pa is atmospheric pressure and Pg is the cooling system pressure indicated by gage 70:

$$V = \frac{C}{1 - \frac{Pa}{Pa + Pg}}$$

Because the radiator and hoses expand a small amount under the test pressure, a volume factor relative to the particular cooling system must be subtracted from C if very accurate results are necessary.

Trapped air can be substantially removed from the cooling system by alternately pressurizing and depressurizing the radiator. Before this operation, the engine must be warmed sufficiently to open the thermostat.

It should now be obvious that the apparatus shown in FIG. 1 also tests the cooling system for coolant leakage. A pressure drop in the radiator as revealed by gage 70 indicates leakage in the cooling system.

FIG. 2 shows a second embodiment of apparatus for measuring the volume of trapped air within a cooling system. In FIG. 2, a frame 90 supports a hydraulic pump assembly 92. Pump assembly 92 includes an air cylinder 94 having a piston therein (not shown) which reciprocates in response to externally supplied air pressure. The pressurized air is supplied through a pressure regulator 96, a T-connector 98, an elbow 100, an air flow regulator 102 and a tube 104 to a valve 106. Two outlets 108 and 110 of valve 106 are connected to inlets 112 and 114 at opposite ends of the air cylinder 94. Two operative positions of valve 106 alternately pressurize one chamber of the air cylinder while bleeding the other chamber to atmosphere. Two other operative positions of valve 106 block air pressure to the outlets 108 and 110 of the air cylinder 94 so that the piston may be selectively stopped in a desired position.

Pump assembly 92 has a transparent glass or plastic cylinder 116 which is held between a plate 118 attached to air cylinder 94 and a cylinder head plate 120. A plurality of bolt and nut fasteners 122 extend between plates 118 and 120 and secure the cylinder 116 therebetween. A piston 124 is supported for reciprocation within cylinder 116 and includes side by side circular discs 126 and 128. A piston rod 129 is operably connected to the air cylinder piston (not shown) and to piston 124 for reciprocation together. Piston 124 and cylinder head 120 define a variable volume pump chamber 130 within the cylinder 116. Marks on the surface of cylinder 116 reveal the volume of coolant within the chamber 130.

Chamber 130 is fluidly connected through an inlet 132 and a rotary on-off valve 134 to a reservoir cylinder 136. Reservoir cylinder 136 is supported on a bracket 138 attached to frame 90. A stand pipe 140 having a plurality of holes 142 extends through the reservoir cylinder 136 and forms an inlet-outlet for the reservoir. A funnel 144 on the upper end of pipe 140 admits coolant into reservoir 136.

An outlet 146 from chamber 130 extends through cylinder head 120, rotary on-off valve 148 and hose 150 to a modified radiator closure or cap 152. The radiator cap 152 is identical to the cap 74 shown in FIG. 1 and has a passage therethrough through which coolant flows. A pressure gage 154 on valve 148 measures the coolant pressure within the radiator.

The apparatus shown in FIG. 2 measures the volume of trapped air within the cooling system of an internal combustion engine. Radiator cap 152 is adapted to engage the filler opening of the automobile radiator. The pump assembly 92 pressurizes the radiator by drawing coolant through valve 134 to fill pump chamber 130 with coolant from reservoir 136. Next, valve 134 is closed and valve 148 is opened. The air cylinder 94 is powered to move piston 124 toward the right which forces coolant from chamber 130 through outlet 146, valve 148, hose 150 and the passage in cap 152 into the radiator. The foregoing operations are repeated until the radiator is pressurized to a predetermined pressure level as revealed by gage 154. A convenient pressure is 15 p.s.i.g. which is approximately twice atmospheric pressure.

Subsequently the radiator is depressurized and the volume of pressurized coolant discharged from the radiator is measured. To depressurize the radiator, valves 148 and 134 are opened and closed respectively, and piston 124 is reciprocated to the left in FIG. 2 to draw water from the radiator into chamber 130. The graduations on cylinder 116 disclose the volume in cubic inches of coolant discharged from the radiator. Coolant is withdrawn until the radiator is at atmospheric pressure as indicated by gage 154.

If the volume of coolant discharged from the radiator exceeds the capacity of chamber 130, valves 148 and 134 are closed and opened respectively and the piston 124 is moved to the right to pump the coolant into reservoir 136. Next, the valves 134 and 148 are closed and opened respectively and the radiator is further depressurized in the aforesaid manner.

The volume of coolant discharged from the radiator equals ½ the volume of trapped air within the cooling system at atmospheric pressure as explained previously.

While the embodiments of the present invention as hereindescribed constitute preferred forms, it is to be understood that other forms may be adapted.

What is claimed is as follows:

1. Apparatus for measuring the volume of trapped air within an automobile cooling system having a radiator comprising: a pressure tight closure adapted to engage the filler opening of the radiator and having a passage therethrough; a coolant pump including a piston reciprocal within a cylinder; pressure response means operably connected to said piston for alternately moving said piston in opposite directions within said cylinder; valve means controlling the pressurization of said pressure responsive means for selectively moving and stopping said piston within said cylinder; said radiator closure passage fluidly connected to interior of said cylinder through a pump outlet; a coolant reservoir fluidly connected to interior of said cylinder through a pump inlet; container means fluidly connected to said radiator closure passage for measuring coolant volume; means for indicating the pressure of coolant in the radiator; first valve means for directing pressurized coolant from the radiator in said volume measuring means; second valve means for directing coolant from said volume measuring means into said reservoir; whereby the volume of trapped air at atmospheric pressure within a coolant filled radiator is measured by first pumping coolant into the radiator until a predetermined pressure is indicated, then by discharging water from the pressurized radiator into said volume measuring means until the radiator coolant is at atmospheric pressure; whereby the volume of trapped air within the coolant system at atmospheric pressure is a function of: the volume of coolant expelled upon the pressurization of the cooling system, the pressure of the coolant in the pressurized coolant system and atmospheric pressure.

2. Apparatus for measuring the volume of trapped air within an automobile cooling system having a radiator with an inlet normally closed by a pressure cap comprising: a modified pressure cap with a fluid passage therethrough for adding and discharging fluid to said radiator; a housing having an interior space defining a fluid reservoir; a fluid pump including a cylinder, a reciprocal piston and a valved cylinder head supported by said housing within said interior space; a valved inlet of said pump in said cylinder head fluidly connected to said reservoir for drawing fluid into said cylinder; a valved outlet of said pump in said cylinder head fluidly connected to said passage in said modified pressure cap for discharging fluid into said radiator and thus pressurizing said cooling system; a pressure gauge between said pump outlet and said pressure cap passage for measuring the fluid pressure within said radiator interior; a transparent container supported on said housing having graduations on its surface to measure fluid volume; said container being fluidly connected to said radiator interior; a first valve supported in said housing for directing fluid from said radiator to said container when opened; a second valve supported in said housing for directing fluid from said container into said reservoir within said housing; whereby the volume of trapped air within the cooling system at atmospheric pressure is a function of: the volume of coolant expelled upon depressurization of the cooling system, the pressure of the coolant in the pressurized cooling system and atmospheric pressure.

References Cited
UNITED STATES PATENTS 2,539,843   1/1951   Kerr _____ 73—37

S. CLEMENT SWISHER, Primary Examiner

U.S. Cl. X.R.

73—149, 290 B